(12) United States Patent
Bjorsvik et al.

(10) Patent No.: US 10,436,372 B2
(45) Date of Patent: Oct. 8, 2019

(54) LARGE-GAP-SEAL ("LGS") ASSEMBLY

(71) Applicant: TDW Delaware, Inc., Wilmington, DE (US)

(72) Inventors: Vigmund Bjorsvik, Sandnes (NO); Marko Langerholc, Kranj (SI)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 15/728,320

(22) Filed: Oct. 9, 2017

(65) Prior Publication Data
US 2019/0107239 A1    Apr. 11, 2019

(51) Int. Cl.
| | | |
|---|---|---|
| F16J 15/02 | (2006.01) | |
| F16L 55/128 | (2006.01) | |
| F16L 55/44 | (2006.01) | |
| F16J 15/06 | (2006.01) | |
| F16J 15/16 | (2006.01) | |
| F16J 15/20 | (2006.01) | |
| F16J 15/46 | (2006.01) | |
| F16L 55/132 | (2006.01) | |
| F16J 15/00 | (2006.01) | |
| E21B 33/12 | (2006.01) | |

(52) U.S. Cl.
CPC ......... *F16L 55/1283* (2013.01); *F16J 15/022* (2013.01); *F16J 15/028* (2013.01); *F16J 15/068* (2013.01); *F16J 15/166* (2013.01); *F16J 15/20* (2013.01); *F16J 15/46* (2013.01); *F16L 55/132* (2013.01); *F16L 55/44* (2013.01); *E21B 33/12* (2013.01); *F16J 15/002* (2013.01)

(58) Field of Classification Search
CPC ..... F16L 55/1283; F16L 55/44; F16L 15/022; F16L 15/002
See application file for complete search history.

(56) References Cited

U.S. PATENT DOCUMENTS

| | | | | |
|---|---|---|---|---|
| 3,124,502 A | * | 3/1964 | Radke | F16J 15/20 277/536 |
| 4,852,394 A | | 8/1989 | Goans | |
| 2001/0045746 A1 | * | 11/2001 | Russell | F16J 15/028 285/105 |
| 2006/0220327 A1 | * | 10/2006 | Russell | F16J 15/121 277/611 |
| 2016/0376869 A1 | | 12/2016 | Rochen et al. | |

FOREIGN PATENT DOCUMENTS

| | | |
|---|---|---|
| CA | 2494290 A1 | 8/2005 |
| WO | 2017127075 A1 | 7/2017 |

* cited by examiner

*Primary Examiner* — Gilbert Y Lee
(74) *Attorney, Agent, or Firm* — Gable Gotwals

(57) ABSTRACT

A large-gap-seal ("LGS") assembly and methods for its assembly and use are described. The LGS assembly has an elastomer core surrounded by adjoining structural segments. Non-adjoining gap segments are located on the sidewall surfaces of the elastomer core, with each gap segment approximately centered beneath the edges of two adjoining structural segments. The gap segments are exposed by the spaces that form between the structural segments when the LGS assembly is activated. Exposing the gap segments rather than the elastomer core protects the elastomer core from damage and preserves the integrity of the seal between the isolation tool and the inner wall of the pipeline.

30 Claims, 6 Drawing Sheets

LARGE-GAP-SEAL ("LGS") ASSEMBLY

BACKGROUND

This disclosure relates generally to piggable or free floating isolation tools for pipe inline services. More specifically, the disclosure relates to elastomer packer seals for pipeline isolation of oil and gas.

Elastomer packer seals generally have an elastomer core in the shape of a ring. In an effort to alleviate the sealing problem of high extrusion gap, conventional seals use an adaptive spring to close the clearance gap between the plug and the pipeline. However, there are openings between the spring coils. Portions of the elastomer core may protrude through these openings, with the resulting loss of elastomer ("elastomer creep") challenging the integrity of the packer as pressure and/or temperature increase. In addition, the spring may become unstable and can fail to support the elastomer core, particularly when the extrusion gap is large and the isolation pressure is high.

There is a need for a dynamic mechanical support structure that can support and protect the elastomer core while allowing large extrusion gaps. There is also a need for a dynamic mechanical support structure that can withstand high pressure forces.

SUMMARY

Embodiments of a large-gap-seal ("LGS") assembly for a piggable isolation tool include multiple gap segments that are located on each sidewall of the elastomer core and spaced apart from each other. The LGS assembly also includes structural segments located above the gap segments. Each structural segment adjoins the adjacent structural segments along their opposing longitudinal edges when the elastomer core is inactive. Each gap segment is positioned on the elastomer core so that its longitudinal centerline lies approximately below the opposing longitudinal edges of adjacent structural segments. When the LGS assembly is activated and the elastomer core expands, causing adjoining structural segments to separate from one another, the gap segments, rather than the elastomer core, are exposed.

A piggable isolation tool for a pipeline includes two or more large-gap-seal (LGS) assemblies. Each LGS assembly has multiple spaced-apart gap segments located on each sidewall of the elastomer core and multiple structural segments located above the gap segments. When the LGS assembly is in an inactive state, the longitudinal centerline of each gap segment is approximately centered beneath opposing longitudinal edges of adjacent structural segments. When the LGS assembly is fully activated, the adjacent structural segments move apart, exposing the gap segments.

A method of deploying an LGS assembly having an elastomer core, gap segments on each sidewall of the elastomer core, and structural segments above the gap segments is also described. The method includes placing the LGS assembly at a selected location within a pipeline and pressurizing the elastomer core. This creates spaces between the opposing longitudinal edges of adjacent structural segments and exposes the gap segments.

This disclosure describes a dynamic mechanical support structure that can support and close the spaces through which the elastomer core can escape when the LGS assembly is activated and the elastomer core is pressurized, thereby protecting the integrity of the elastomer core and ensuring a safe and reliable seal between the isolation tool and the inner wall of the pipeline. Other advantages of the disclosure may include: (a) using a softer rubber (such as 33-50 Shore A) for the elastomer core, which improves the sealing capabilities in rough or irregular pipelines; (b) supporting large extrusion gaps between the end of the tool body and the inner diameter of the pipeline, thereby allowing the use of a smaller plug with reduced risk of becoming stuck in the pipeline; (c) combining large extrusion gaps with high pressure isolations; (d) allowing the isolation tool to operate at higher pressures and/or higher expansions than conventional tools; (e) using one isolation tool to cover a greater range of pipeline sizes than conventional tools; and (f) enabling the re-use of structural segments when the elastomer core must be replaced.

ELEMENTS AND NUMBERS USED IN THE DRAWING FIGURES

20 Piggable isolation tool
25 Slip
30 LGS assembly
40 Plug pressure head
50 Elastomer core
51 Inner ring of elastomer core
52 Outer ring of elastomer core
53 Inside diameter edge
55 Sidewall
57 Outside diameter edge
58 exposed portion
59 Covered portion
60 Gap segment
61 Core face surface
63 Plug pressure head face surface
65 Longitudinal centerline
67 Outside diameter edge
69 Inside diameter edge
70 Structural segment
71 Core face surface
73 Plug pressure head face surface
75 Longitudinal edge
80 Glide plate
90 Guide slot
95 Guide tab 100 Guide pocket
105 Guide pin
110 Seal return spring
120 Overlapping flexible lip on gap segment
125 Overlapping flexible lip on structural segment
P Pipeline Definitions Large gap: seal gap extrusion where the ratio of pipeline inner diameter to tool outer diameter is greater than approximately 1.10.

DETAILED DESCRIPTION OF THE PREFERRED EMBODIMENTS

Referring to FIGS. 1-10, embodiments of a piggable isolation tool 20 have slips 25 which grip the inner wall of the pipeline and one or more large-gap seal ("LGS") assemblies 30. When activated and pressurized, the LGS assembly 30 holds the elastomer core 50 of the assembly 30 against the inner wall of the pipeline P, creating a seal and isolating that portion of the pipeline. The isolation tool 20 may be comprised of multiple LGS assemblies 30.

Figure 5:
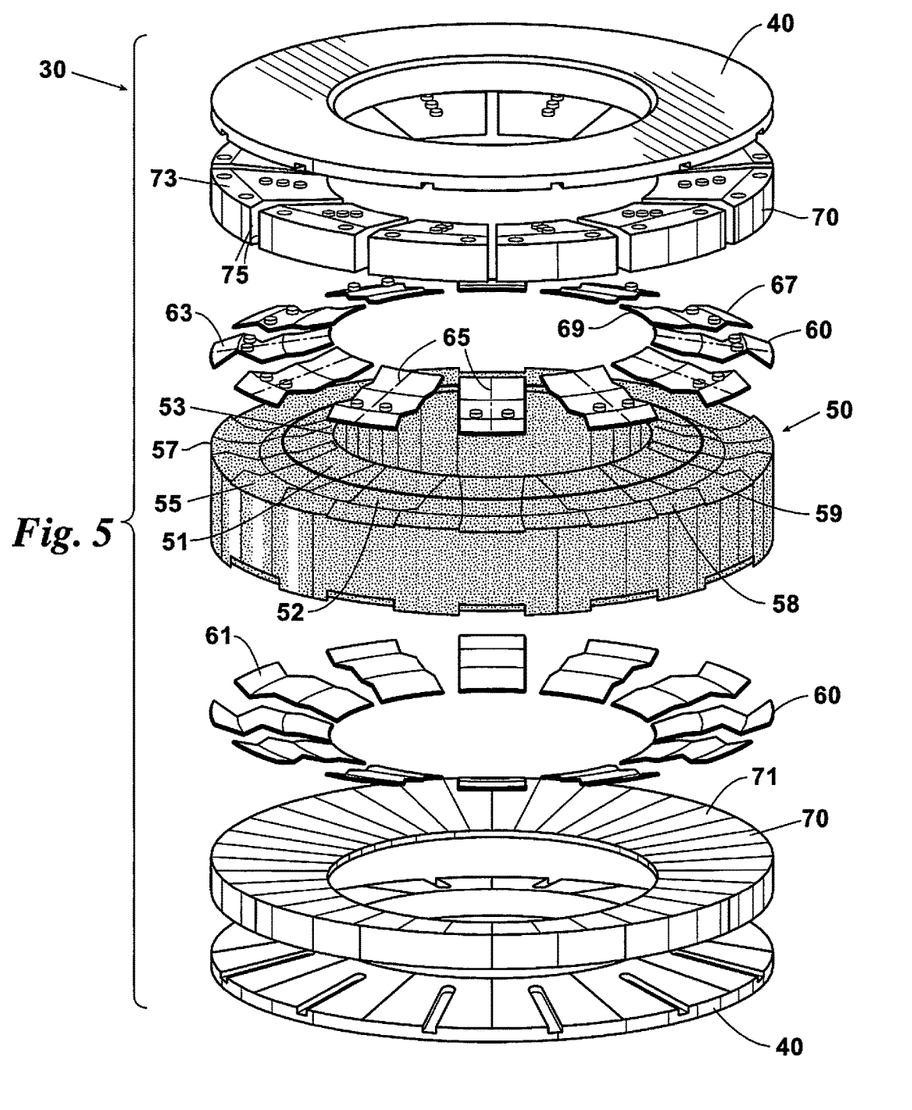
FIG. 5 is an exploded view of an embodiment of the LGS assembly.
Figure 6:
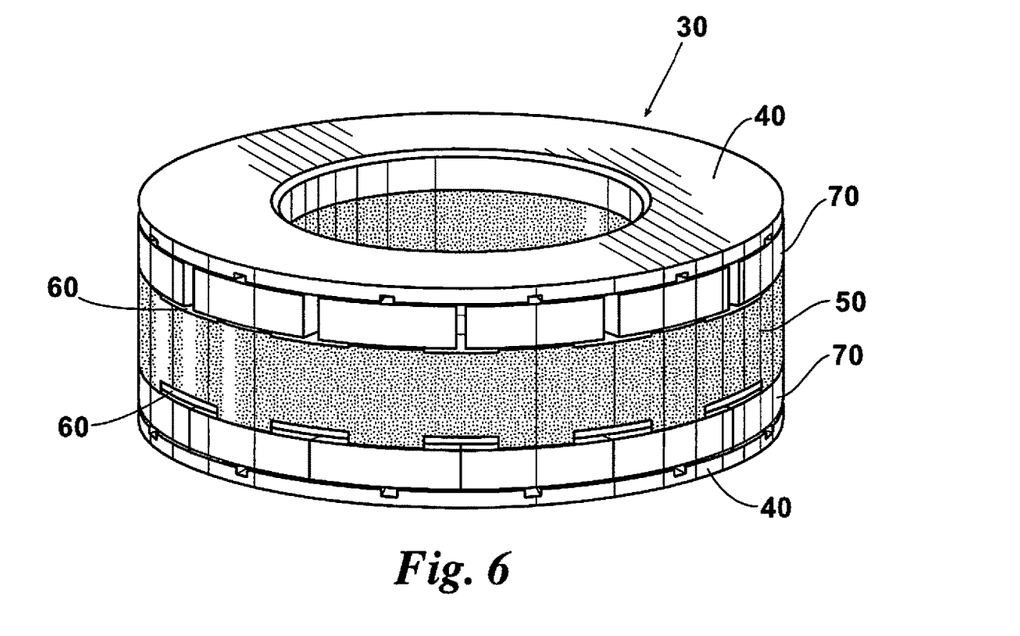
FIG. 6 is an isometric view of an embodiment of the LGS assembly shown in FIG. 5.
Figure 7:
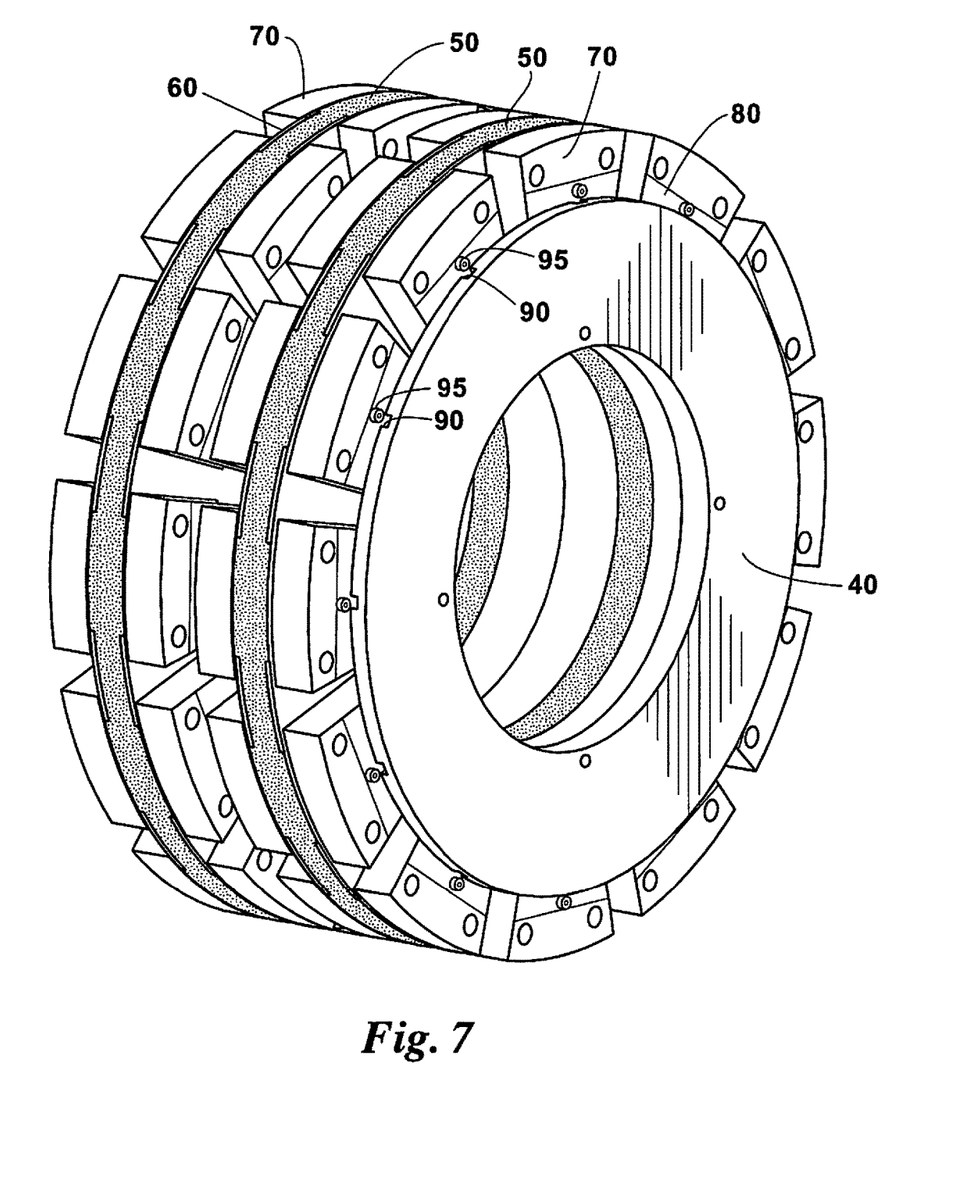
FIG. 7 is an isometric view of an activated seal with two LGS assemblies.

Referring to FIGS. 5-7, the LGS assembly 30 is comprised of an inner elastomer core 50, gap segments 60, structural segments 70, and plug pressure heads 40. The material and profile of each component may vary depending upon the desired application. As an example, for applications with very high pressure, the structural segments and gap segments may be designed with stronger materials and profile types that close any spaces where the elastomer may escape.

The elastomer core 50 may be an elastomer suited for the application requirements, including but not limited to NBR-50Shore A. The outside diameter edge 57 of the elastomer core 50 seals against the inner wall of the pipeline, while the inside diameter edge 53 of the elastomer core 50 seals against the packer support ring (not shown). Each sidewall 55 of the elastomer core 50 is covered by a plug pressure head 40. The elastomer core 50 may be divided into two or more separate rings to help regulate the amount of stress on the core 50 and to improve its performance. For example, as shown in FIG. 5, the elastomer core 50 may have an inner ring 51 surrounded by an outer ring 52.

Structural segments 70, which include a core face surface 71 complementary in shape to the profile of the opposing sidewall 55 of the elastomer core 50 and extend in a v-like shape from the inside diameter edge 53 to the outside diameter edge 57 of the elastomer core 50, are located between the elastomer core 50 and each plug pressure head 40. Structural segments 70 may be made of aluminum, steel, or a composite material including but not limited to carbon fiber, cell material, reinforced polymers, or metals.

Glide plates 80, which facilitate the movement of structural segments 70 when the LGS assembly 30 is deployed or retracted, may be located between the structural segments 70 and each plug pressure head 40. Each glide plate 80 may be associated with one structural segment 70 and connected to the plug pressure head face surface 73 of the structural segment 70. Depending on the characteristics of the structural segments 70, glide plates 80 may not be required.

Figure 8:
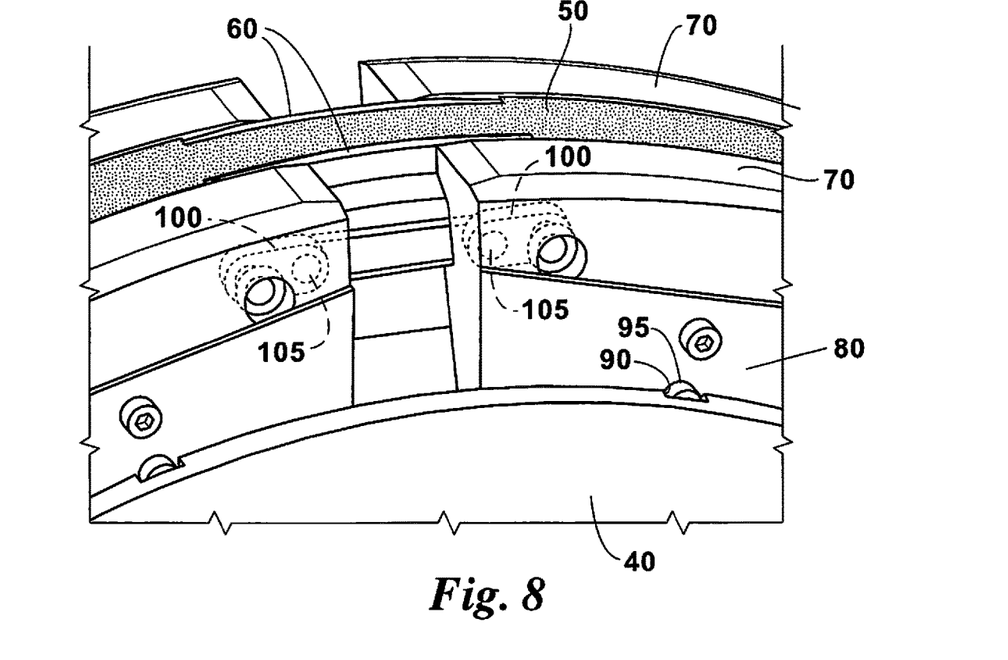
FIG. 8 is an expanded view of an embodiment of the LGS assembly during deployment of the seal.

Referring to FIG. 7 and FIG. 8, in addition to the core face surface 71 of the structural segments 70, tabs or slots may be used to control the position of the structural segments 70 when they are moving outward or inward with the elastomer core 50. For example, as shown in FIG. 7, guide slots 90 on the plug pressure head 40 may receive guide tabs 95 on the glide plates 80 in order to maintain the desired angle when the LGS assembly 30 is being deployed. As another example, guide slots on the glide plate may receive guide tabs on the plug pressure head. As shown in FIG. 8, guide pockets 100 on the structural segments 70 may receive guide pins 105 on the gap segments 60. Alternatively, the guide pins 105 may be located on the structural segments 70 and the guide pockets 100 may be located on the gap segments 60. The guide pockets 100 and guide pins 105 may further assist in controlling the spacing between the gap segments 60 and structural segments 70 and in maintaining the desired angle during expansion of the elastomer core 50 and deployment of the LGS assembly 30.

Figure 9:
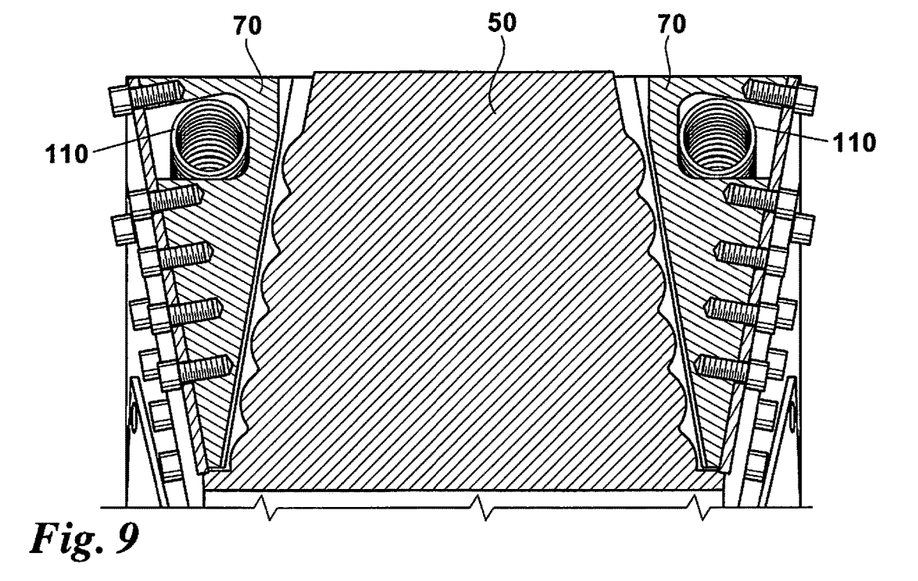
FIG. 9 is a partial cross-section of an embodiment of the LGS assembly, including the seal return spring.

A seal return spring 110 may be placed inside each structural segment 70, as shown in FIG. 9, or on top of each structural segment 70. The seal return spring 110 makes the LGS assembly 30 more robust by increasing the strength of the compression force, keeping the structural segments 70 connected and centered to the isolation tool 20 during pigging and unsetting, preventing the structural segments 70 from extending beyond the body of the LGS assembly 30, and preventing damaged structural segments 70 from falling apart. For example, seal return springs 110 may be particularly useful for applications that have a long duration and/or where the isolation tool 20 must be transported (pigged) over long distances inside the pipeline. Design alternatives for the seal return spring 110 may include, but are not limited to, a hooped spring that encompasses all of the structural segments 70 in a particular layer and an integrated tension spring located inside each structural segment 70.

Figure 1:
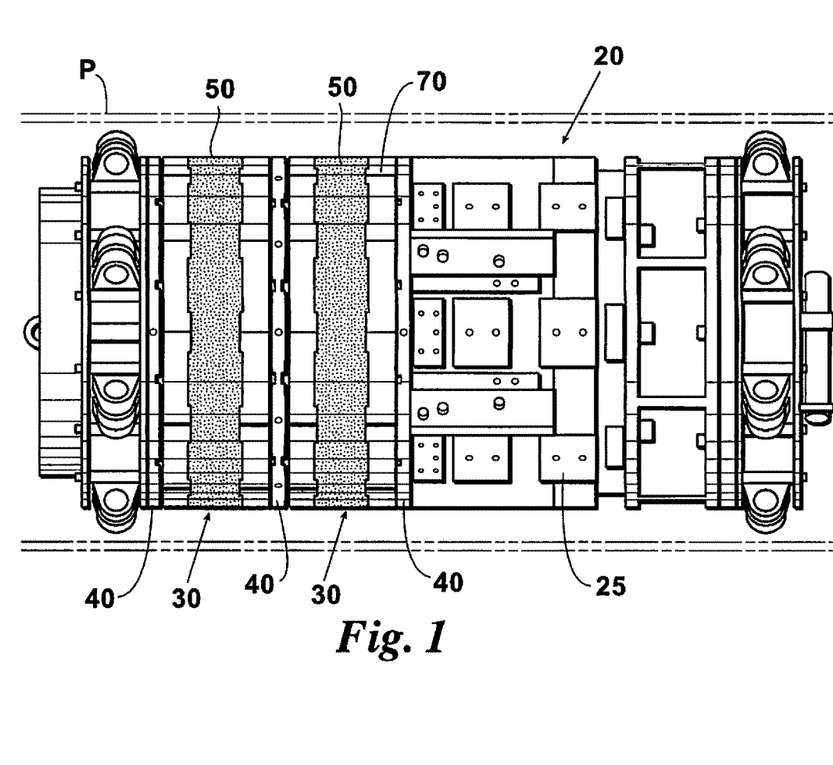
FIG. 1 is an isometric view of an embodiment of a piggable isolation tool, shown in pigging (traveling) mode.
Figure 2:
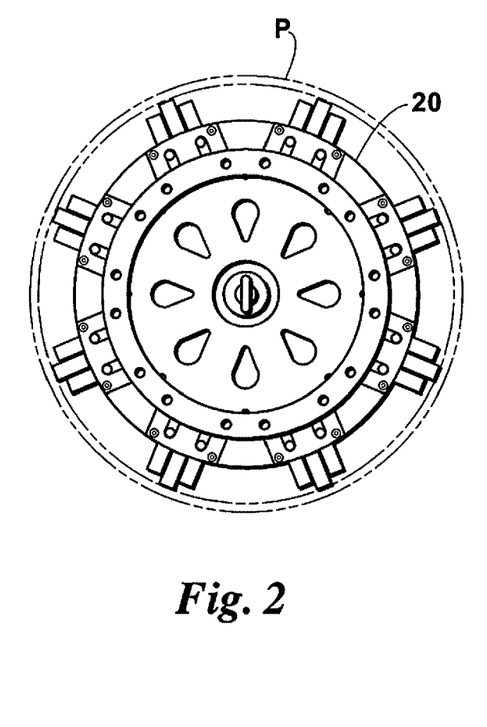
FIG. 2 is an orthogonal view of an embodiment of a piggable isolation tool, shown in pigging (traveling) mode.
Figure 3:
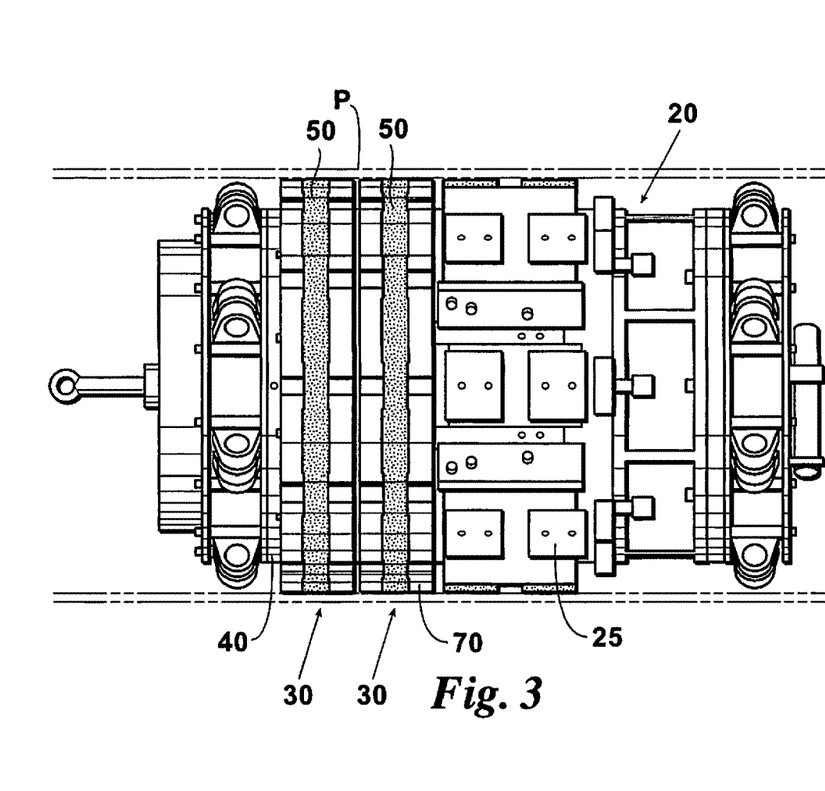
FIG. 3 is an orthogonal view of an embodiment of a piggable isolation tool, shown in set (deployed) mode.
Figure 4:
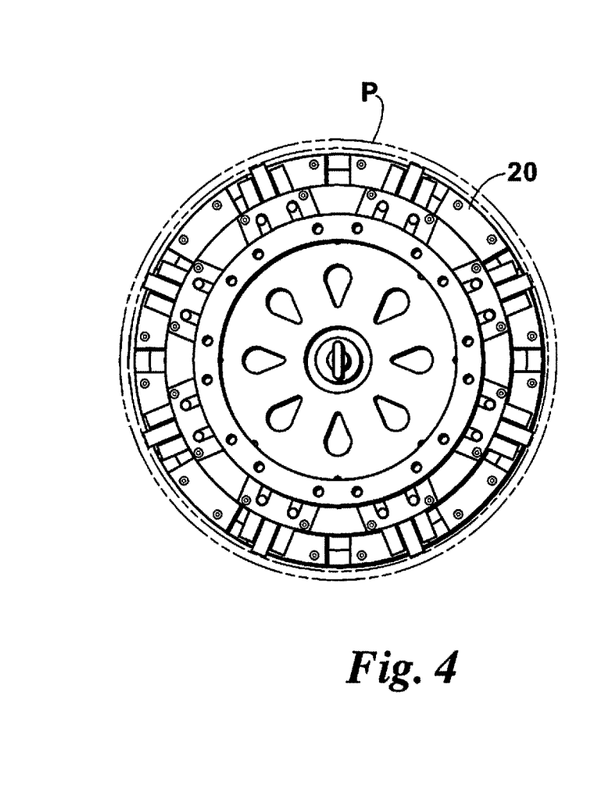
FIG. 4 is an orthogonal view of an embodiment of a piggable isolation tool, shown in set (deployed) mode.

Gap segments 60, which are located on the sidewalls 55 of the elastomer core 50 and underneath the structural segments 70, are spaced apart from one another and generally centered beneath the points where adjacent structural segments 70 meet. In other words, the approximate longitudinal centerline 65 of the gap segment 60 is aligned with the adjoining longitudinal edges 75 of two adjacent structural segments 70. Each gap segment 60 has a core face surface 61 that is complementary in shape to the profile of the opposing sidewall 55 of the elastomer core 50, extends from the inside diameter edge 53 to the outside diameter edge 57 of the elastomer core 50, and is in contact with the elastomer core 50. Gap segments 60 may be made of metal, and are preferably made of metal/composite with low friction toward sliding parts, i.e., a friction coefficient ranging from approximately 0.1 to approximately 0.2. They can be rectangular or v-shaped, as shown in FIG. 4, and may have a height (thickness) that is less than the height of the structural segments 70.

Figure 10:
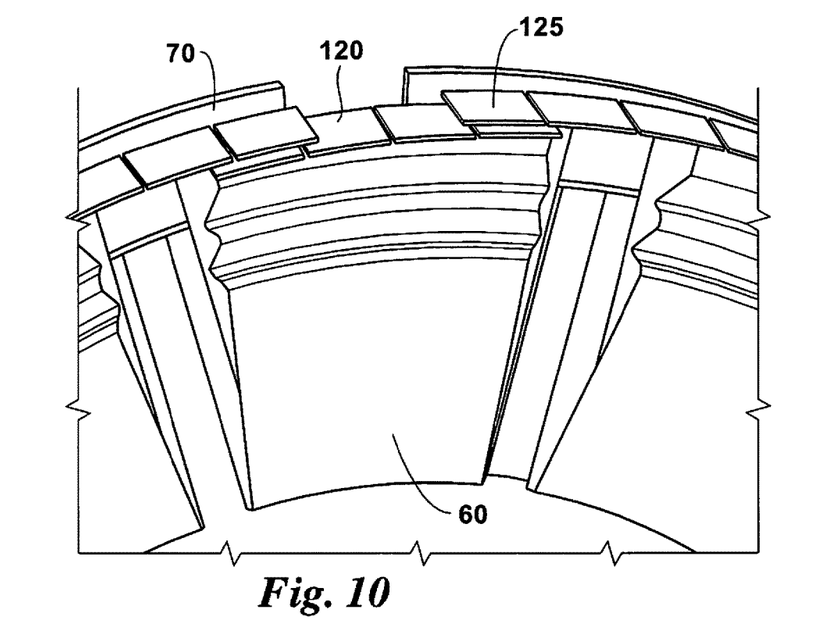
FIG. 10 is a partial isometric view of an embodiment of the LGS assembly, including overlapping flexible lips on the gap segment and the structural segment.

The surface between the elastomer core 50 and the core face surface 61 of the gap segments 60 may be lubricated to reduce friction. The plug pressure head face surface 63 of the gap segments 60, which is in contact with the structural segments 70, may also be lubricated to reduce friction. As shown in FIG. 10, an overlapping flexible lip 120 may be added to the gap segments 60 to prevent the elastomer core 50 from protruding into the spaces that may form between the outside diameter edge 67 of the gap segment 60 and the inner pipeline wall when the pipeline wall is irregular and/or partially occluded. Similarly, an overlapping flexible lip 125 may be added to the structural segments 70 to protect the elastomer core 50.

The ratio of structural segments 70 to gap segments 60, and the space between gap segments 60 (the "gap size") depends on the application where the LGS assembly 30 will be used. The portion of the sidewall 55 of the elastomer core 50 that is covered by gap segment 60 may be defined by an inside and outside diameter arc of 360°/2N, where N is the number of gap segments 60. The portion of the sidewall 55 that is covered by structural segment 70 may be defined by an arc of 360°/M, where M is the number of structural segments 70.

As shown as an example in FIG. 5, twelve structural segments 70, along with twelve gap segments 60, may be used on each sidewall 55 of the elastomer core 50. The twelve structural segments 70 cover the respective sidewall 55 of the elastomer core 50, forming twelve sets of adjoining longitudinal edges 75. A gap segment 60 is located beneath each set of adjoining longitudinal edges 75. Each gap segment 60 may be sized to span or cover a portion of the sidewall 55 of the elastomer core 50 that is approximately half the size as that covered by each structural segment 70.

If twelve gap segments 60 are used, each gap segment 60 covers an arc of approximately 15° at the inside diameter edge 53 of the elastomer core 50 to an arc of approximately 15° at the outside diameter edge 57 of the elastomer core 50. As a result, the longitudinal centerline 65 of each gap segment 60 is approximately 30° from the longitudinal centerline 65 of the adjacent gap segment 60. When the gap segments 60 are spaced apart from one another in this manner—and not yet covered by the structural segments 70—there are twelve exposed portions 58 and twelve covered portions 59 of the sidewall 55, with each portion being approximately equal in size to the gap segments 60. Each structural segment 70 may be sized to span the portion of the sidewall 55 of the elastomer core 50 that is defined by an arc of approximately 30° at the inside diameter edge 53 of the elastomer core 50 to an arc of approximately 30° at the outside diameter edge 57 of the elastomer core 50.

The steps in assembling the LGS assembly 30 are shown in the exploded view of FIG. 5. The plug pressure head 40 is prepared for assembly by adding lubricants, such as low friction paste, on the surface of the plug pressure head 40 that will receive the structural segments 70. The first layer of structural segments 70 is positioned on the plug pressure head 40 and around the packer support ring. The first layer of gap segments 60 is placed on the structural segments 70 so that the longitudinal centerline 65 of each gap segment 60 is approximately aligned with the adjoining longitudinal edges 75 of adjacent structural segments 70. The elastomer core 50 is then placed on top of the first layer of structural segments 70 and the first layer of gap segments 60. The second layer of gap segments 60, followed by the second layer of structural segments 70, is positioned around the packer support ring and on top of the elastomer core 50. Once again, the second layer of gap segments 60 is positioned so that each gap segment 60 is approximately centered beneath the adjoining longitudinal edges 75 of adjacent structural segments 70. Lubricants may be added between the elastomer core 50, the gap segments 60, and/or the structural segments 70 to control the gliding friction. The second plug pressure head 40, or bowl, is placed on top of the second layer of structural segments 70 to complete the LGS assembly 30.

The seal is activated by compressing the isolation tool 20. Such pressurization causes the elastomer core 50 to expand by allowing the structural segments 70 (and the associated glide plates 80, if present) to slide outwards toward the pipeline wall. The movement of the structural segments 70 causes the space between adjacent longitudinal edges 75 of the structural segments 70 to increase. As the spaces increase, they expose the gap segments 60 on the elastomer core 50, which are sized to be larger than the span of the space between the structural segments 70. As a result, when the LGS assembly 30 is fully activated, the transformed and pressurized elastomer core 50 cannot escape into the spaces between structural segments 70. The elastomer core 50 is protected from damage and the integrity of the seal against the pipeline wall is preserved.

The gap segments 60 and the structural segments 70 continue to move until they contact the inside wall of the pipeline. Further compression of the LGS assembly 30 activates the seal between sections of the pipeline. The delta pressure ("DP") over the seal may then be increased, with the pressure inside the seal remaining higher than the DP. When the LGS assembly 30 is de-pressurized, the elastomer core 50 contracts due to elastomer "memory", which returns the structural segments 70 and gap segments 60 to their original positions. This contraction may be further enabled by the profile of the gap segments 60 and structural segments 70 and the friction between them. The LGS assembly 30 may be set and unset at operating pressures ranging from zero to several hundred bar, depending upon the desired design parameter. The strength of the structural segments 70 and the gap segments 60 will determine the maximum pipeline pressure the LGS assembly 30 can support.

While preferred embodiments of a LGS assembly and methods for its assembly and use have been described, changes can be made in the details of the LGS assembly, its construction, and the steps of each method without departing from the scope of the following claims.

What is claimed:

1. A large-gap-seal assembly for a piggable isolation tool comprising:
    a plurality of circumferentially spaced apart gap segments located on a sidewall of an elastomer core, the elastomer core being exposed on the sidewall between adjacent gap segments of the plurality of gap segments; and
    a plurality of structural segments located above the gap segments;
    each structural segment adjoining an adjacent structural segment along opposing longitudinal edges when the elastomer core is in an inactivated size, a longitudinal centerline of each gap segment lying approximately below the opposing longitudinal edges; and
    each structural segment not adjoining the adjacent structural segment along the opposing longitudinal edges when the elastomer core is in an activated size, wherein in the activated size a portion of the gap segment is exposed between adjacent structural segments.

2. A large-gap-seal assembly according to claim 1 further comprising the elastomer core having a fully activated size wherein each gap segment is sized to cover a portion of the sidewall of the elastomer core larger than a space formed between the opposing longitudinal edges of the structural segments when the elastomer core is at the fully activated size.

3. A large-gap-seal assembly according to claim 1 wherein each gap segment is sized to cover a first portion of the sidewall of the elastomer core when the elastomer core is in the inactivated size, the first portion spanning between an inside diameter edge and an outside diameter edge of the elastomer core equal to 360°/2N, where N is the number of gap segments.

4. A large-gap-seal assembly according to claim 1 wherein each structural segment is sized to cover a second portion of the sidewall of the elastomer core when the elastomer core is in the inactivated size, the second portion spanning between an inside diameter edge and an outside diameter edge of the elastomer core equal to 360°/M, where M is the number of structural segments.

5. A large-gap-seal assembly according to claim 1 wherein a core face surface of the structural segment is complementary in profile to the respective opposing second portion of the sidewall of the elastomer core.

6. A large-gap-seal assembly according to claim 1 wherein a core face surface of the gap segment is in contact with the respective opposing first portion of the sidewall of the elastomer core.

7. A large-gap-seal assembly according to claim 1 wherein the gap segments are rectangular or v-shaped.

8. A large-gap-seal assembly according to claim 1 wherein a glide plate is located on a plug pressure head surface of the structural segment.

9. A large-gap-seal assembly according to claim 1 further comprising means for controlling a position of the structural segment.

10. A large-gap-seal assembly according to claim 9 wherein the means for controlling the position of the structural segment is a guide slot on a plug pressure head that receives a guide tab on a glide plate attached to a plug pressure head face surface of the structural segment.

11. A large-gap-seal assembly according to claim 9 wherein the means for controlling the position of the structural segment is a guide slot on a glide plate attached to a plug pressure head face surface of the structural segment that receives a guide tab on the plug pressure head.

12. A large-gap-seal assembly according to claim 1 wherein a guide pocket in the structural segment receives a guide pin on a plug pressure head face surface of the gap segment, thereby controlling spacing between the structural segment and the gap segment.

13. A large-gap-seal assembly according to claim 1 wherein a guide pocket in the gap segment receives a guide pin on a core face surface of the structural segment, thereby controlling spacing between the structural segment and the gap segment.

14. A large-gap-seal assembly according to claim 1 wherein a seal return spring is located inside or above the structural segment.

15. A large-gap-seal assembly according to claim 1 wherein the gap segment or the structural segment has a flexible lip that overlaps an outside diameter edge of the elastomer core.

16. A large-gap-seal assembly according to claim 1 wherein lubricant is applied to the sidewall of the elastomer core, a core face surface of the gap segments, or a plug pressure head face surface of the gap segments.

17. A large-gap-seal assembly according to claim 1 further comprising twelve structural segments and twelve gap segments.

18. A large-gap-seal assembly according to claim 1 wherein the elastomer core is divided into a plurality of rings.

19. A piggable isolation tool for a pipeline, the tool comprising a plurality of large-gap-seal assemblies, wherein each large-gap-seal assembly comprises:
   a plurality of circumferentially spaced apart gap segments located on a sidewall of an elastomer core, the elastomer core being exposed on the sidewall between adjacent gap segments of the plurality of gap segments; and
   a plurality of structural segments located above the gap segments, each structural segment adjoining an adjacent structural segment along opposing longitudinal edges when the elastomer core is in an inactivated size, a longitudinal centerline of each gap segment lying approximately below the opposing longitudinal edges;
   each structural segment not adjoining the adjacent structural segment along the opposing longitudinal edges when the elastomer core is in an activated size;
   wherein in the activated size a portion of the gap segment is exposed between adjacent structural segments.

20. A method of deploying a large-gap-seal assembly comprising:
   placing the large-gap-seal assembly at a selected location within a pipeline, the large-gap-seal assembly having an elastomer core, a plurality of circumferentially spaced apart gap segments on a sidewall of the elastomer core, and a plurality of structural segments above the gap segments; and
   pressurizing the elastomer core to create a space between opposing longitudinal edges of adjacent structural segments and expose a gap segment;
   wherein the elastomer core is exposed on the sidewall between adjacent gap segments of the plurality of spaced apart gap segments;
   wherein before the pressurizing each structural segment adjoins an adjacent structural segment along opposing longitudinal edges; and
   wherein after the pressurizing each structural segment is not adjoining the adjacent structural segment along the opposing longitudinal edges; and
   wherein after the pressurizing a portion of the gap segment is exposed between adjacent structural segments.

21. A method of deploying a large-gap-seal assembly according to claim 20, further comprising de-pressurizing the elastomer core of the large-gap-seal assembly.

22. A large-gap-seal assembly for a piggable isolation tool comprising:
   a plurality of spaced apart gap segments located on a sidewall of an elastomer core; and
   a plurality of structural segments located above the gap segments;
   each structural segment adjoining an adjacent structural segment along opposing longitudinal edges when the elastomer core is in an inactivated size, a longitudinal centerline of each gap segment lying approximately below the opposing longitudinal edges; and
   means for controlling a position of the structural segment.

23. A large-gap-seal assembly according to claim 22, wherein the means for controlling the position include a glide plate located on a plug pressure head surface of the structural segment.

24. A large-gap-seal assembly according to claim 23, wherein the means for controlling the position of the structural segment further includes a guide tab on the guide plate and a guide slot configured to receives the guide tab.

25. A large-gap-seal assembly according to claim 22 further comprising the structural segment including a guide pocket configured to receive a guide pin on a plug pressure head face surface of the gap segment, thereby controlling spacing between the structural segment and the gap segment.

26. A large-gap-seal assembly according to claim 22 further comprising a guide pocket in the gap segment configured to receive a guide pin on a core face surface of the structural segment, thereby controlling spacing between the structural segment and the gap segment.

27. A large-gap-seal assembly according to claim 22 further comprising a seal return spring located inside or above the structural segment.

28. A large-gap-seal assembly according to claim 22, at least one of the gap segment and the structural segment including a flexible lip that overlaps an outside diameter edge of the elastomer core.

29. A large-gap-seal assembly according to claim 22 wherein lubricant is applied to at least one of the sidewall of the elastomer core, a core face surface of the gap segments, and a plug pressure head face surface of the gap segments.

30. A large-gap-seal assembly according to claim 22 wherein the elastomer core is divided into a plurality of rings.

* * * * *